United States Patent [19]

Fabris et al.

[11] 3,896,091

[45] July 22, 1975

[54] MODIFIED POLYVINYL CHLORIDE

[75] Inventors: Hubert Jakob Fabris, Akron; Heinz Uelzmann; Willem Johannes Van Essen, both of Tallmadge, all of Ohio

[73] Assignee: The General Tire & Rubber Company, Akron, Ohio

[22] Filed: Feb. 13, 1974

[21] Appl. No.: 442,259

[52] U.S. Cl.................... 260/78.4 D; 260/92.8 A
[51] Int. Cl.$^2$................ C08G 63/76; C08F 114/06
[58] Field of Search... 260/78.4 D, 92.8 A, 92.8 CA

[56] References Cited
UNITED STATES PATENTS
3,576,914   4/1971   Donat.............................. 260/92.8 A

*Primary Examiner*—Joseph L. Schofer
*Assistant Examiner*—Maria S. Tungol

[57] ABSTRACT

The dehydrohalogenation of polyvinyl chloride conducted in the presence of a dienophile results in a Diels-Alder reaction between the polyvinyl chloride and the dienophile, producing a polycyclic non-crosslinked modified polyvinyl chloride.

7 Claims, No Drawings

MODIFIED POLYVINYL CHLORIDE

BACKGROUND OF THE INVENTION

Polyvinyl chloride (PVC) is known to lose HCl at elevated temperatures of 150°C. or more to form conjugated, unsaturated polymer systems. In the early stages of dehydrochlorination the products are colorless. As the dehydrochlorination proceeds, the conjugated system of double bonds is extended, and a polymeric material is produced that absorbs radiation in the visible range of wavelengths and has a yellow color. As more and more extended conjugation appears, the wavelength of absorption shifts to longer frequencies, i.e., a bathochromic shift. This dehydrochlorination reaction is swiftly followed by secondary reactions such as radical branching and intermolecular Diels-Alder addition, leading generally to more or less tightly crosslinked, insoluble products which cannot further be processed.

It is known in the prior art to stabilized PVC against discoloration by the addition of small amount of dienophiles, especially maleic anhydride and derivatives thereof. Dienophiles are well known in the prior art especially in regard to the Diels-Alder reaction. Examples of dienophiles include tetracyanoethylene, crotonaldehyde, cinnamic acid, maleic anhydride, 1-nitropropene, acrylontrile, acrolein, ethyl acrylate, betanitrostyrene, 1,3-butadiene, imides of maleic acid, such as maleimide, N-methyl maleimide and N-phenylmaleimide, benzoquinone, norbornene, 2-hydroxymethyl-5-norbornene, indene, trans-1,2-bis(phenylsulfone)-ethylene or hexachlorocyclopentadiene or any compound of the general structure RCH=CHR' or R'CH=CHR' where R can be H—or $C_6H_5$—; R' can be —CH=CH$_2$, —COOalkyl, —COOaryl, —NO$_2$, —SO$_2$alkyl, —SO$_2$aryl, —CH$_2$—O—SO$_2$alkyl, —O—alkyl, —O-aryl, —C$_6$H$_5$, —COOH; two R' groups can be

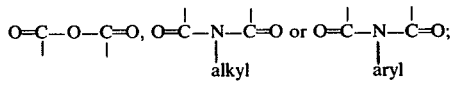

and many more as described in the prior art.

In certain cases, the dienophile can be formed in situ if so desired. Maleic or fumaric ester, for instance, can be produced during the dehydrochlorination reaction from maleic anhydride and the corresponding alcohol. The HCl evolved during the dehydrochlorination is the catalyst for the second esterification step, the first one being the anhydride ring opening reaction.

HCl or other acidic catalysts can also be added in order to achieve esterification before the temperature of dehydrohalogenation is reached. Some of these catalysts (Lewis acid type) can also promote dehydrohalogenation thus giving more conjugated double bonds or allowing dehydrohalogenation to occur at a lower temperature.

However, the prior art was only interested in heat stabilization, consequently utilized only small effective amounts ranging up to 10 parts by weight of dienophiles per 100 parts by weight PVC and has not thereby prepared an identifiable modified, non-crosslinked PVC.

SUMMARY OF THE INVENTION

In accordance with the practice of this invention, there is prepared a modified polyvinyl chloride by controllably reacting in situ a polyvinyl chloride and a dienophile.

More particularly, a polyvinyl chloride is simultaneously dehydrochlorinated and reacted with a dienophile in an amount sufficient to yield a modified polycyclic polyvinyl chloride with increased thermal stability, for example, increased stability against heat degradation (decomposition at elevated temperatures) and increased stability against heat distortion (higher heat distortion point). The dienophile is utilized in an amount of at least about 70, preferably 100, parts by weight of dienophile per 100 parts by weight of non-modified polyvinyl chloride, more preferably at least 2,000 parts by weight dienophile per 100 parts by weight non-modified polyvinyl chloride. The dienophile must be substantially unreactive with HCl under the conditions of dehydrohalogenation meaning that it must not react in a non-reversible fashion with HCl under such conditions and must be a sufficient solvent for the polyvinyl chloride at least to swell the polyvinyl chloride particles sufficiently for a Diels-Alder reaction to take place throughout each polymer or each such particle.

The PVC is typically dissolved in a solvent. In the preferred practice hereof the dienophile is utilized as the solvent. The preferred dienophiles include maleic anhydride and hexachlorocyclopentadiene.

The reaction is typically conducted at an elevated temperature of about 100°C. to 300°C. for about 1 to 60 hours.

After the completion of the reaction, the excess non-utilized dienophile is removed prior to the recovery of the modified PVC. Preferably, the excess dienophile is removed by extraction with a suitable solvent which is a non-solvent for the modified PVC, but other standard separation removal techniques can be used, the method of separation not being critical to this invention.

DISCUSSION OF DETAILS AND PREFERRED EMBODIMENTS

In a typical preparation of modified PVC, the commercial suspension grade PVC is heated to about 180° to 200°C. for a specified time (4 to 60 hours) either in a suspension of the polymer together with the dienophile in an inert heat transfer fluid (e.g., paraffin oil) or preferably in the molten dienophile itself as solvent to insure a soluble product. Hydrogen chloride is eliminated during this period. The dienophile adds to the conjugated double bonds and new polycyclic and reactive polymers are obtained.

The preferred dienophiles are maleic anhydride, hexachlorocyclopentadiene and the diester derivatives of maleic anhydride or maleic acid, preferably containing no more than about 20 carbon atoms.

For the case of maleic anhydride as the dienophile the reaction can be represented as follows:

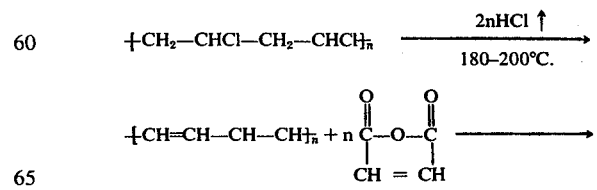

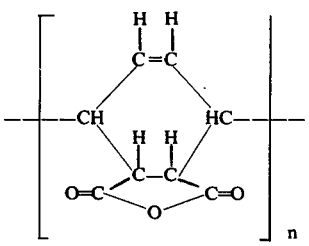

where *n* is a number.

The resulting product has a structure quite different from PVC. The anhydride group is very reactive making the product a novel reactive polymer. The longer the PVC is reacted, the more the chain is converted over to this cyclic structure. Products containing as high as 65% of these cyclic structures were obtained after 53 hours at 196°C. Reactive groups on the primary Diels-Alder product can be further modified by secondary reactions. Thus products can be esterified, transesterified, transamidated, hydrogenated, halogenated, or, as in the case of the adduct of hexachlorocyclopentadiene, thermally aromatized.

For the case of hexachlorocyclopentadiene as the dienophile the reaction can be represented as follows:

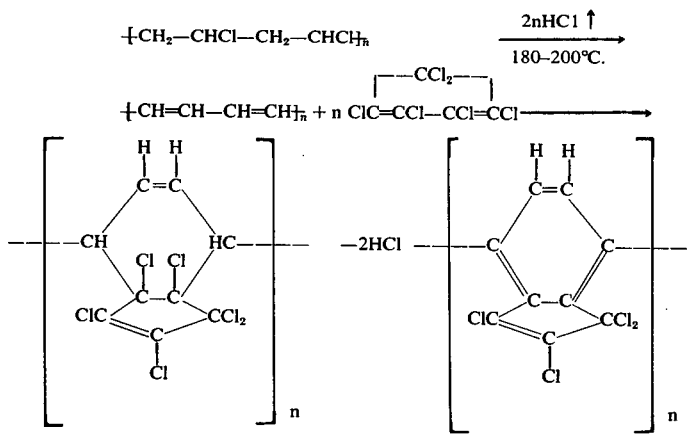

where *n* is a number.

The polycyclic polymers have improved rigidity at elevated temperatures and, if containing suitably reactive groups, have good adhesion to metal and are useful as plastics, binders for primerless metal coatings, wire coatings, wall coverings, upholstery, shower curtains, metal to metal adhesives, epoxy curing agents in adhesive compositions, and co-reactants and crosslinkers in polyurethane foams and coatings. The modified polyvinyl chloride containing ether, ester, carboxylic acid or anhydride groups can also be crosslinked or otherwise reacted with polyols, polyamines or polyvalent metal ions leading to polymer compositions with further improved properties, such as increased stability against heat degradation and heat distortion and solvent resistance for use as disclosed above.

The modified polyvinyl chloride resins of the present invention can be mixed with the usual polyvinyl chloride compounding agents such as plasticizers, lubricants, stabilizers, processing aids, pigments or colorants, and fillers and the like. The modified polyvinyl chloride resins may also be blended with other substantially compatible polymeric materials, in amounts up to about 50% by weight of the blend, such as unmodified polyvinyl chloride, after chlorinated PVC, polyvinylidene chloride, nitrile rubber, vinyl chloride-vinylidene chloride copolymers, vinyl chloride-acrylonitrile copolymers, vinyl chloride-maleate ester copolymers, vinyl chloride-vinyl acetate copolymers, vinyl chloride-methyl acrylate copolymers, vinyl chloride-vinyl ether copolymers and the like and mixtures thereof.

The following examples will serve to illustrate the present invention with more particularity to those skilled in the art. All quantitative measurements are by weight unless otherwise noted.

EXAMPLE 1

This example relates to the dehydrochlorination of polyvinyl chloride in molten maleic anhydride.

To 1,500 grams of molten maleic anhydride (about 60°C.) in a resin kettle under a nitrogen atmosphere were added 50 grams of a commercial polyvinyl chloride of viscosity average molecular weight of about 33,000 (The General Tire & Rubber Co., Vygen 50), and the temperature of the mixture was slowly raised by means of a preheated oil bath (250°C.) while stirring.

The polyvinyl chloride visibly swelled at 120°C. At 195°C. the maleic anhydride started to reflux, and a homogeneous, light brown solution was obtained. After ten minutes at 196°C. HCl was evolved, and the solution turned to a dark brown color.

Heating was continued at 196°C. for a total of four hours before the mixture was allowed to cool. The resulting dark product was extracted in the reaction vessel with boiling $CCl_4$ to remove the excess maleic anhydride and, after drying, weighed 69 grams. The polymer product was reprecipitated from a tetrahydrofuran solution by adding it slowly to excess isopropanol.

PRODUCT ANALYSIS:

The original polyvinyl chloride contained about 56.5% chlorine. The resulting modified PVC contained 50.1% chlorine and had an inherent viscosity (0.3% in cyclohexanone) of 0.594 dl/g. Differential thermal analysis showed an endothermic reaction at 275°C. followed by an exothermic process at approximately 350°C.

EXAMPLE 2

Mixtures of the same unmodified polyvinyl chloride (PVC) and maleic anhydride as used in Example 1, above, were prepared in the amounts shown in TABLE I, below, and were treated under conditions identical to those described in Example 1. The results obtained are shown in TABLE I, below:

TABLE I

|  | A | B | C | D |
|---|---|---|---|---|
| PVC (gms.) | 250 | 250 | 250 | 250 |
| Maleic anhydride (gms.) | 1000 | 750 | 500 | 250 |
| % Cl of product | 49.4 | 44.1 | 45.7 | 43.7 |
| Inh. visc. (dl/g) (0.3% in cyclohexanone) | 0.613 | 0.562 | 0.612 | 0.667 |

EXAMPLE 3

A dry blend of 1,500 grams of a commercial polyvinyl chloride (The General Tire & Rubber Co., Vygen 110) having an average molecular weight (by viscosity method) of 93,000 and 1130 grams of powdered maleic anhydride was dispersed in about 1.9 liters of mineral oil in a stirred glass reactor and was then heated in an oil bath to 205°C. for four hours.

Separation from the mineral oil (upper layer) and extraction with boiling $CCl_4$ produced 225 grams of a brown polymer which contained 48.1% Cl and which had an inherent viscosity (0.3% in cyclohexanone) of 0.902 dl/g.

Sixty (60) grams of the obtained polymer were blended on a mill with 2.4 grams of a commercial barium-cadmium stearate heat stabilizer (Ferro 1825) and 0.3 gram of stearic acid. Test samples were pressed at 350°C. and had the following properties:

TABLE II

| Heat distortion (at 18.6 kg./cm.² load) | |
|---|---|
| 0.254 mm. | 71°C. |
| 1.524 mm. | 79°C. |
| Flexural strength (kg./cm.²) | 982. |
| Flexural modulus × 10⁻⁵ (kg./cm.²) | .353 |

EXAMPLE 4

To 500 grams of stirred liquid maleic anhydride in a 3 liter resin kettle heated to reflux in an oil bath (196°C.) were added 250 grams of a commercial polyvinyl chloride (The General Tire & Rubber Co., Vygen 65) having a viscosity average molecular weight of about 65,000. The mixture was heated with vigorous stirring at 196° to 197°C. for the time periods indicated in TABLE III, below. Diethylbenzene (2 liters) was then added to the hot mixture. After thorough mixing the reactor contents were subjected to vacuum distillation. At 70°C. and 3–4 mm. Hg a mixture of diethylbenzene and unreacted maleic anhydride distilled off. The diethylbenzene was separated, returned to the reactor and distilled again. The process was repeated (usually three times) until all excess maleic anhydride was recovered.

The solid resin residue was milled on a hammer mill, washed with $CCl_4$ and dried at 65°C. in a vacuum oven. Reaction times and analytical data of the obtained materials are given in TABLE III.

TABLE III

| Exp. No. | Reaction time (hrs.) | % Cl | % O₂ | % MA in Polymer | Inh. visc. dl/g. | Flexural Strength (kg./cm.²) | Flexural Mod. × 10⁻⁵ (kg./cm.²) |
|---|---|---|---|---|---|---|---|
| 1 | 0 | 56.5 | 0 | 0 | 0.708 | 688. | 0.288 |
| 2 | 4 | 47.5 | 5.48 | 17.2 | 0.781 | 527. | 0.384 |
| 3 | 6 | 46.88 | 6.41 | 20.1 | 0.798 | — | — |
| 4 | 8 | 45.3 | 7.07 | 22.1 | 0.646 | 738. | 0.373 |
| 5 | 23.5 | 39.0 | 11.1 | 34.4 | 0.624 | 771. | 0.402 |
| 6 | 53 | 18.8 | 22.0 | 68.7 | 0.482 | — | — |

EXAMPLE 5

This example relates to the dehydrochlorination of PVC in hexachlorocyclopentadiene.

A mixture of 50 grams of the same unmodified polyvinyl chloride as used in Example 1 and 300 grams of hexachlorocyclopentadiene was stirred and heated in a reactor at 115° to 120°C. until a clear straw yellow viscous solution resulted. At 150°C. the gel consistency disappeared and the mixture became a mobile liquid. Traces of HCl came out. After 15 minutes at 200°C. the solution became dark and HCl evolved. The pot temperature was kept at 202° to 206°C. for 23 hours. At the end HCl was still evolving. Six hundred milliliters of tetrahydrofuran (THF) was added and stirred. The resulting solution was poured into two liters of methanol with agitation. Filtration and reprecipitation of the solids from a tetrahydrofuran solution into methanol gave 63 grams of a light brown product, of which 38 grams was boiled in one liter of methanol for one hour, then filtered and dried overnight in vacuum for analysis with no loss in weight.

The resulting material melted at 170°C. and formed a black liquid. It was soluble in $CHCl_3$, $CCl_4$, benzene and THF and insoluble in hexane and methanol.

PRODUCT ANALYSIS:
% Cl 56.14, 56.25; Mol. wt. (VPO in THF): over 20,000.

IR showed the presence of possible tetrachloroindene units, which means that aromatization of the Diels-Alder adduct occurred by thermal elimination of two HCl from the dichlorocyclohexene units Differential thermal analysis showed an exothermic change at 150° to 225°C. followed by an endothermic reaction at 275°C.

EXAMPLE 6

This example relates to the crosslinking of anhydride modified PVC with diol.

Four portions (63.3 grams each) of the maleic anhydride modified PVC produced in EXAMPLE 4, Exp. 2, above, were dissolved in THF and reacted with the indicated amounts of 1,4-butanediol at the temperatures shown. Films were cast on glass plates, cured at 70°C. in an air oven for 30 minutes and tested. TABLE IV, below, shows the properties obtained at the indicated test temperatures:

TABLE IV

| Test Temp. °C. | Properties | Physical Properties Unmodified PVC (The General Tire & Rubber Co., Vygen 85, Molecular weight of 74,000) | 1,4-butanediol gram/63.3 grams of the modified PVC 0 | 0.16 |
| --- | --- | --- | --- | --- |
| RT (ca 25°C.) | Tens.(kg./cm.$^2$) | 152 | — | 338 |
| | Elong. (%) | 230 | — | 10 |
| 80 | Tens.(kg./cm.$^2$) | 46.6 | 118 | 141 |
| | Elong. (%) | 470 | 470 | 270 |
| 120 | Tens.(kg./cm.$^2$) | 14.1 | 42.3 | 70.5 |
| | Elong. (%) | 200 | 370 | 350 |
| 150 | Tens.(kg./cm.$^2$) | 3.2 | 25.4 | 38 |
| | Elong. (%) | 100 | 500 | 107 |
| 180 | Tens.(kg./cm.$^2$) | * | 14.8 | 21.1 |
| | Elong. (%) | * | 300 | 60 |

*Not Measurable

EXAMPLE 7

The same unmodified PVC as used in Example 3 (62.5 grams) and dimethylmaleate (300 grams) were heated in a stirred reactor to 200°C. for four hours. After cooling, the mixture was extracted with boiling methanol; the resulting polymer was dissolved in THF (500 ml.) and was precipitated in two liters of methanol. The obtained, off-white fibrous polymer weighed 50 grams and contained 53.47% chlorine. Infrared spectrum analysis confirmed the presence of esters of cyclohexene dicarboxylic acid in the polymer backbone.

EXAMPLE 8

A mixture of 50 grams of the same unmodified PVC as used in Example 4 and 216 grams of di-2-ethylhexylmaleate was heated in a suitable reactor. At 120°C. a clear solution resulted. At 200°C. HCl evolved. The temperature was maintained at 200°C. for five hours, and the resulting polymer was precipitated with methanol. After drying, 50 grams of polymer product were obtained. The infrared spectrum showed the absorption characteristic for ester carbonyl.

EXAMPLE 9

A mixture of the same unmodified PVC as used in Example 4 (62.5 grams), dibutylmaleate (300 grams) and ZnCl$_2$ (2.0 grams) (Friedel-Crafts catalyst) was heated to 150°C. for two hours. Hydrogen chloride was evolved, and the mixture became very viscous. The polymer product was isolated by precipitation with methanol. Reprecipitation from a tetrahydrofuran solution into methanol gave 62 grams of polymer product containing 50.3% chlorine. The infrared spectrum confirmed the presence of butylester structure in the polymer.

EXAMPLE 10

This example relates to the dehydrohalogenation of PVC in di-2-ethylhexylmaleate formed in situ.

A mixture of 62.5 grams of the same unmodified PVC as used in Example 4, 18 grams of maleic anhydride and 250 grams of 2-ethyl-hexanol was heated 4.5 hours at 200°C. After cooling, the resulting gel-like polymer was broken up and washed three times with isopropanol in a Waring blender. The powdery precipitate was filtered, washed with isopropanol and dried.

A part of the product was dissolved in THF and precipitated in methanol. The tan powder contained 51.57% chlorine. The infrared spectrum confirmed the presence of di-ester structures.

EXAMPLE 11

This example relates to the dehydrohalogenation of PVC in dibutylmaleate.

A mixture of 62.5 grams of the same unmodified PVC as used in Example 4, above, 300 grams of dibutylmaleate and 10 cc. of BF$_3$-etherate (Friedel-Crafts catalyst) was heated to 180°C. for 3.5 hours and then an additional hour at 194° to 199°C. Copious amounts of HCl were evolved. The polymer product was precipitated in isopropanol and washed. Reprecipitation from a tetrahydrofuran solution into isopropanol gave 53 grams of a yellowish powder.

PRODUCT ANALYSIS:

% Cl 54.81; inh. visc. (0.3% in cyclohexanone):0.67 dl/g. Vygen 65 inh. visc.: 0.68 dl/g.

EXAMPLE 12

The example relates to the dehydrohalogenation of PVC in diphenylmaleate formed in situ.

A mixture of 125 grams of the same unmodified PVC as used in Example 4, 196 grams of maleic anhydride and 185 grams of phenol was heated in a flask at 200°C. for 4.5 hours. After cooling the flask contents were digested in methanol. After reprecipitation from a tetrahydrofuran solution into methanol the polymer was filtered, washed and dried (at 30°–40°C. in vacuo). The product had a creamy yellow color. The yield was 122 grams. It softened at 120°C., darkened at 140°C. and was completely molten at 190°C. The chlorine content was 43.4%. Infrared spectrum confirmed the presence of phenyl ester structures.

A portion (60 grams) of the above product was mixed in a Waring blender with 2.4 grams of the same heat stabilizer as used in Example 3. Test bars press molded at 176.7°C. and 6804 kg. platen pressure had the following properties.

TABLE V

| | The Modified PVC | Control, The Above Unmodified PVC (Vygen 65) |
| --- | --- | --- |
| Heat Distortion at 18.6 kg./cm.$^2$ | | |
| 0.254 mm. | 77°C. | 73.5°C. |
| 1.524 mm. | 87°C. | 83°C. |
| Flexural strength (kg./cm.$^2$) | 950 | 673 |
| Flexural modulus × 10$^{-5}$ (kg./cm.$^2$) | 0.32 | 0.26 |

EXAMPLE 13

Polyvinyl chloride (Vygen 110, 250 g.) and 1300 ml. hexachlorocyclopentadiene were heated to 250°C. for 4½ hours. After cooling, 1 ltr. THF was added and the polymer precipitated in $CH_3OH$. After two more re-precipitations from $THF/CH_3OH$ the material was dried. 7.5 g. of this product were mixed with PVC (42.5 g. Vygen 110), .25 g. of stearic acid and 2.4 g. of Ferro 1825 (stabilizer) in a Waring blender. Bars, pressed at 350°F. and 6804 kg. showed the following properties.

| Heat Distortion (at 18.6 kg./cm.² load) | | |
|---|---|---|
| 0.254 mm. | | 74°C. |
| 1.524 mm. | | 80°C. |
| Flexural strength | (kg./cm.²) | 897. |
| Flexural modulus × 10⁻⁵ | (kg./cm.²) | 0.347 |

What is claimed is:

1. A process for preparing a modified polyvinyl chloride which comprises (1) reacting in a Diels-Alder reaction polyvinyl chloride and a dienophile in an amount of at least 70 parts by weight of dienophile per 100 parts by weight of non-modified polyvinyl chloride at ambient pressure and at a temperature in the range of from about 100°C. to 300°C. but not above the reflux temperature of the system for 1 to 60 hours under conditions under which said polyvinyl chloride dehydrochlorinates, said dienophile being a sufficinet solvent for said polyvinyl chloride at least to swell said polyvinyl chloride and being substantially unreactive with hydrogen chloride under said reaction conditions, and (2) recovering the resulting modified polyvinyl chloride.

2. A process in accordance with claim 1 wherein said reaction is effected at the reflux temperature of the system.

3. A process in accordance with claim 1 wherein said dienophile is selected from the class consisting of maleic anhydride, hexachlorocyclopentadiene and diesters of maleic acid.

4. A process in accordance with claim 3 where said dienophile is maleic anhydride.

5. A process in accordance with claim 3 where said dienophile is hexachlorocyclopentadiene.

6. A process in accordance with claim 3 where said dienophile is a diester of maleic acid, said diester containing no more than about 20 carbon atoms.

7. The product of the process of claim 3.

* * * * *